May 30, 1950 R. E. SCHULZ 2,509,888
POWER LOCKING DRIVE CHUCK
Filed July 7, 1947 2 Sheets-Sheet 1
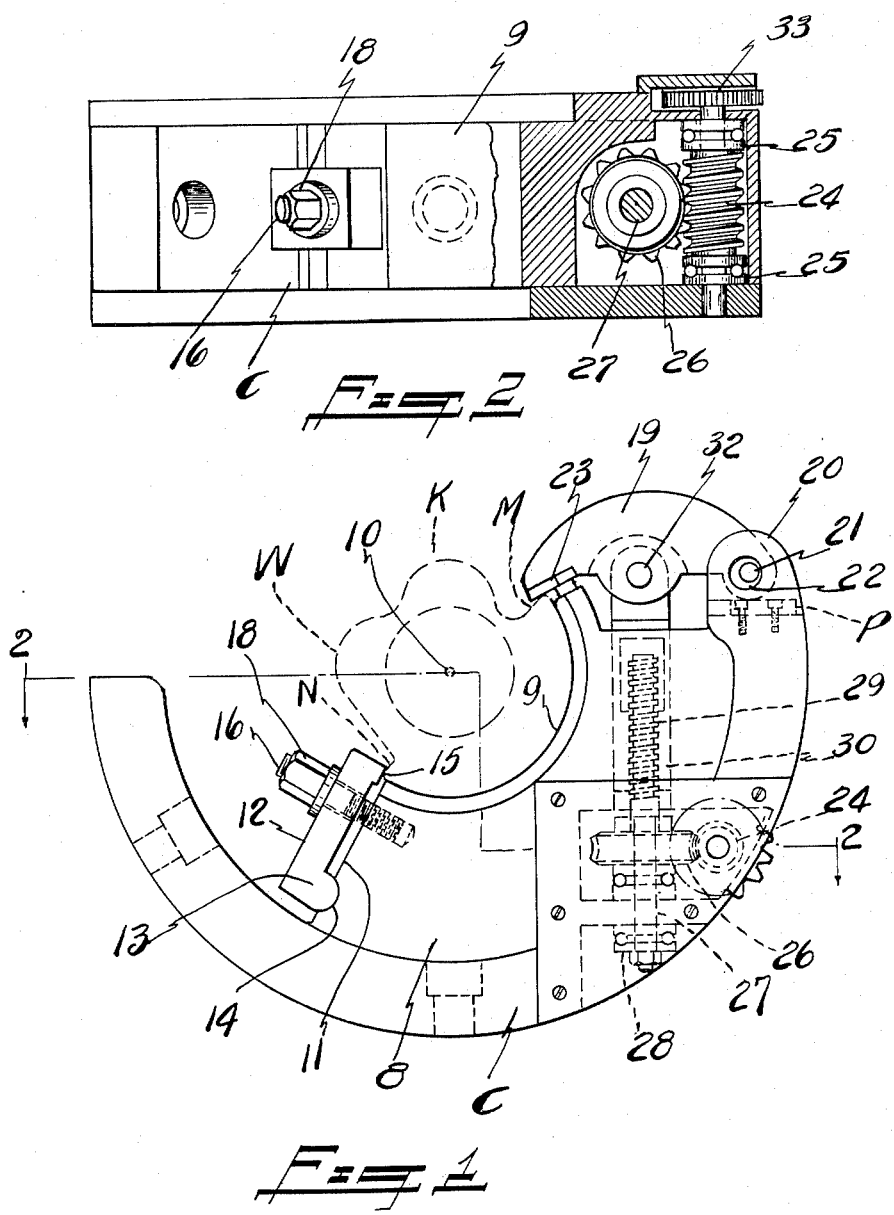
INVENTOR.
Richard E. Schulz.
BY
Frank C. Garman.

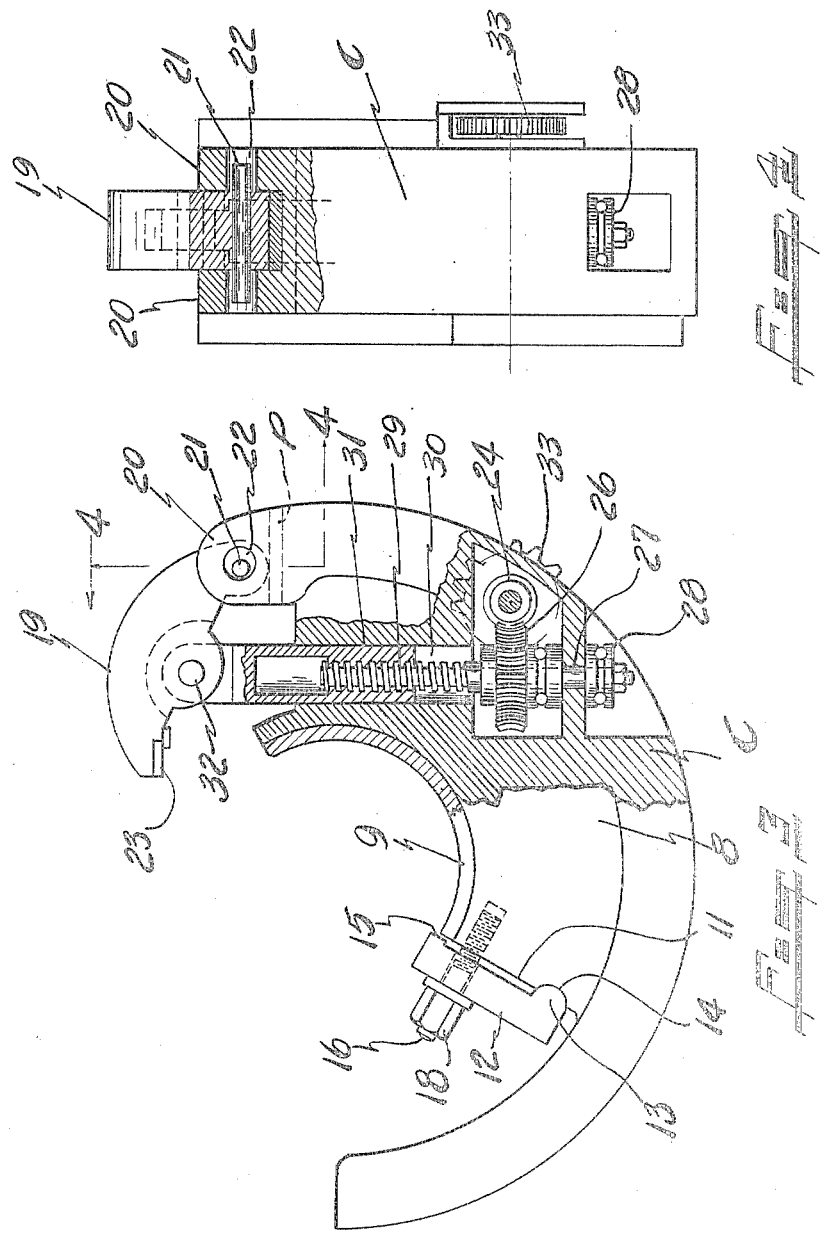

Patented May 30, 1950

2,509,888

UNITED STATES PATENT OFFICE 2,509,888

POWER LOCKING DRIVE CHUCK

Richard E. Schulz, Saginaw, Mich., assignor to Wickes Bros., Saginaw, Mich.

Application July 7, 1947, Serial No. 759,331

7 Claims. (Cl. 82—40)

This invention relates to work-holding devices for lathes, and more particularly to a power locking drive chuck for firmly gripping a crankshaft in a center drive type crankshaft lathe.

One of the prime objects of the invention is to design a chuck which is rapid in its locking and unlocking operation, powerful in clamping action, so that it securely holds the crankshaft in proper position, and which is fully automatic in its operation.

Another object of the invention is to provide a power locking drive chuck, composed of few parts, all of which are of sturdy, substantial construction, and which can be readily manufactured and assembled.

A further object is to provide a chuck having ample throat opening, so that a rough, unfinished crankshaft can be readily loaded and locked in position, and from which the finished shaft can be easily removed, without marring or endangering the finish.

A further object still is to provide a sturdy, quick-acting clamping means which firmly grips and holds the crankshaft in accurate centered position in a lathe, eliminating any so-called "hogging in" of the tools during the machining operation and the possibility of twisted, broken stock and rejects.

To the accomplishment of the foregoing and related ends, said invention then consists in the means hereinafter more fully described, particularly pointed out in the appended claims and annexed drawings, the following description setting forth, in detail, certain means and one mode of carrying out the invention, such disclosed means and mode illustrating, however, but one of the various ways in which the principle of the invention may be used.

In the drawings:

Fig. 1 is an axial view of the side of the center drive power chucking device incorporating the principles and features of the invention, and showing, in broken lines, a crankshaft locked in position therein.

Fig. 2 is a part-sectional, top plan view illustrating the worm and worm wheel mechanism.

Fig. 3 is a view similar to Fig. 1, parts being broken away to show the construction, the clamping jaw being shown in open position to illustrate the clear, unobstructed space to permit loading and unloading of the crankshaft.

Fig. 4 is a part-sectional, edge-elevational view taken on the line 4—4 of Fig. 3.

Referring now more specifically to the drawings in which I have shown, for the purpose of illustration, a chuck body or carrier member C. This is disc-shaped as shown in Figs. 1 and 3 of the drawings, and is of a size to accommodate the work to be machined.

The web portion 8 of the chuck body is formed with a removable, pre-machined bushing 9 in which the pre-machined and ground crank counter-balanced web W of the crankshaft K is mounted, said crankshaft being located on the axis of rotation 10 of the lathe, the ends of the crankshaft being supported in the usual lathe centers (not shown), and I do not deem it necessary to show or describe the lathe, as the instant application is directed to the chuck mechanism only.

An angularly disposed surface 11 is provided at the one end of the removable bushing member 9, and an abutment clamp 12 is mounted thereon, said clamp being formed with a depending rounded section 13 which snugly fits a groove 14 provided on the surface 11 to secure it in position. A depending shoulder 15 is formed on the opposite end of the clamp 12, this shouldered end overhanging the one end of the bushing 9, studs 16 being threaded in said web, and nuts 18 serve to secure the clamp to the chuck, the abutment being adjustable to suit cranks of different dimensions.

A clamping jaw 19 is pivotally connected to the bifurcated end 20 of the chuck body by means of a pin 21, the ends of the pin being mounted in enlarged openings 22 formed in the bifurcated sections to provide the necessary movement of the jaw during the locking and unlocking operation.

A hardened land 23 is provided on the free end of the jaw for engagement with the crank, and a cam plate P is provided directly below the hinge pin to maintain the hinged end of the jaw in position.

The jaw actuating mechanism is clearly shown in Figs. 2 and 3 of the drawings, and comprises a horizontally disposed worm 24 journaled in suitable bearings 25 provided in the chuck body, said worm meshing with and driving a worm wheel 26 which is mounted on a shaft 27, said shaft being journaled in bearings 28 with its one end section threaded as at 29.

A vertically disposed bore 30 is provided in the chuck body as shown, and an interiorly threaded connecting rod 31 is reciprocatingly mounted therein and has threaded engagement with the threaded section 29 of the shaft, the upper end of said rod being pivotally connected to the clamping jaw 19 at a point intermediate its length by means of a pin 32.

The worm 24 is driven by means of a gear 33 which is mounted on the end of the worm shaft 34 and can be connected to any suitable source of power, so that it can be automatically controlled in any desired manner.

The abutment clamp 12, when set, usually remains in adjusted position, the end of the clamp overhanging the end of the pre-machined surface 9, and when the crankshaft K is loaded in the lathe, the shouldered section N bears against the depending shoulder 15 of the clamp; then when the automatic control (not shown) is actuated to drive the gear 33, the worm, worm wheel and shaft 24, 26, and 27 respectively will be driven, and the connecting rod 31 will be forced downwardly so that the free end of the clamping jaw 19 engages the opposite shoulder M on the web W; this forces the shoulder N against the clamp 12, and continued movement of the jaw firmly secures the web against the bushing 9 so that the crankshaft will be accurately secured in true centered position in the lathe.

After the machining operation is completed, the sequence is reversed, the clamping jaw 19 being swung upwardly so that the finished crankshaft can be readily removed. The locking and unlocking action is very rapid and fully automatic, and the chuck firmly and accurately secures the crankshaft in position.

Having thus set forth and described my invention, what I claim as new and desire to secure by Letters Patent is:

1. In a center drive crankshaft chuck, a work carrier member having a pre-machined bushing engageable with the shouldered web of a crankshaft, a work-engaging abutment member forming a projecting end wall at one end of said bushing, and engaging a shoulder of the crankshaft to one side of the axis of rotation of the crankshaft, a work-engaging clamping jaw hingedly connected to the chuck adjacent the opposite end of the bushing for engagement with an opposed shoulder on the opposite side of the axis of rotation of the crankshaft, a connecting rod pivotally connected to said jaw at a point intermediate its length, and power-actuated driven means engageable with said rod to adjust it vertically and swing the jaw to locked and unlocked position.

2. The combination as defined in claim 1 in which the hinged end of the jaw is loosely connected to said chuck, said jaw tending to rotate the crankshaft and firmly clamp the crankshaft web against said bushing.

3. The combination defined in claim 1 in which the connecting rod is threaded, a threaded shaft having threaded engagement with said rod, and means for driving said shaft for reciprocating said connecting rod.

4. The combination set forth in claim 1 in which the work-engaging abutment member is adjustable with relation to the bushing, and a rib on the clamp and engageable with the chuck to anchor it in position.

5. In a center drive crankshaft comprising a work-carrier member having a pre-machined bushing provided thereon, an adjustable work-engaging abutment at one end of said bushing and engaging the pre-machined ground and shouldered web of a crankshaft to one side of the axis of rotation of the chuck, a hingedly connected clamping jaw engageable with the shouldered web of the crankshaft opposite the point of engagement of the abutment, a connecting rod connected to said jaw at a point intermediate its length, and a pinion for actuating said rod to simultaneously force the web into firm engagement with the abutment and securely against the bushing of the work-carrier.

6. In a chucking device for machine tools, comprising a chuck body, a pre-machined, removable bushing provided thereon and adapted to receive the pre-machined and ground shouldered web of a crankshaft, a work-engaging abutment member forming a shoulder on the web of the crankshaft to one side of the axis of rotation thereof, a work-engaging clamping jaw loosely and hingedly connected to the chuck adjacent the opposite end of the bushing, and engaging a shoulder on the crankshaft web diametrically opposite to the abutment member, and a mechanically actuated, reciprocal connecting rod having a threaded shaft engageable therewith, and an offset pinion drivingly connected to said shaft for swinging said jaw into engagement with the web of a crankshaft for locking it securely against said abutment and bushing.

7. In a chucking device for machine tools, comprising a chuck body, a pre-machined, removable bushing provided thereon and adapted to receive the pre-machined and ground shouldered web of a crankshaft, a work-engaging abutment member forming the end wall of one end of said bushing, and engageable with a shoulder on the web of the crankshaft to one side of the axis of rotation thereof, a work-engaging clamping jaw loosely and hingedly connected to the chuck adjacent the opposite end of the bushing, and engaging a shoulder on the crankshaft web diametrically opposite to the abutment member, and a threaded, mechanically-actuated reciprocable means for swinging said jaw into engagement with the web of a crankshaft, said reciprocable means comprising a threaded connecting rod, a threaded shaft engageable therewith, a worm wheel on the shaft, and a pinion drivingly connected to the worm wheel for swinging the clamping jaw to lock and unlock said crankshaft with relation to said bushing.

RICHARD E. SCHULZ.

REFERENCES CITED

The following references are of record in the file of this patent:

UNITED STATES PATENTS

| Number | Name | Date |
| --- | --- | --- |
| 2,109,371 | Groene | Feb. 22, 1938 |
| 2,249,240 | Groene | July 15, 1941 |
| 2,322,623 | Floeter | June 22, 1943 |
| 2,354,258 | Groene | July 25, 1944 |

FOREIGN PATENTS

| Number | Country | Date |
| --- | --- | --- |
| 605,632 | Germany | Nov. 15, 1937 |